Feb. 9, 1960          E. D. TOLIN          2,924,756

INDICATING AND CONTROL APPARATUS

Filed July 14, 1955

INVENTOR.
E. D. TOLIN
BY Hudson & Young
ATTORNEYS

United States Patent Office 2,924,756
Patented Feb. 9, 1960

2,924,756
INDICATING AND CONTROL APPARATUS

Ernest D. Tolin, Bartlesville, Okla., assignor to Phillips Petroleum Company, a corporation of Delaware Application July 14, 1955, Serial No. 522,067

10 Claims. (Cl. 317—146)

This invention relates to level indicating apparatus. In another aspect it relates to apparatus to detect materials in terms of the dielectric properties thereof.

In various industrial operations there is a need for apparatus to measure the levels of liquids and solids in containers. For example, in the chemical and petroleum industries, liquid levels in various tanks and reactors must be measured and/or controlled. In the transportation of several fluids through a pipeline in sequence it is desirable to be able to determine the interface between different fluids. In the storage of solid materials in hoppers it is often important to be able to measure levels without direct inspection.

The present invention is directed primarily toward providing simple electrical apparatus which is capable of determining levels and identifying materials in terms of the dielectric properties thereof. A probe element in the form of an electrical capacitor is adapted to be positioned in a container so that the material being measured can form the dielectric material between spaced elements forming the capacitor electrodes. The detecting circuit comprises a single vacuum tube oscillator having a control device in the plate circuit thereof. The oscillator normally is biased so as to oscillate intermittently when the dielectric between the capacitor electrodes is less than a predetermined value. The capacitor is connected in the feedback circuit of the oscillator so that decreased feedback allows continuous oscillations when the dielectric constant of the material between the capacitor electrodes is greater than a predetermined value. The continuous oscillations result in sufficient current flowing through the plate circuit to energize an indicating or control device.

Accordingly, it is an object of this invention to provide simple electrical apparatus capable of detecting levels of materials in terms of the dielectric properties thereof.

Another object is to provide apparatus capable of distinguishing between materials having different dielectric properties.

Other objects, advantages and features of the invention should become apparent from the following detailed description taken in conjunction with the accompanying drawing in which.

Figure 1:
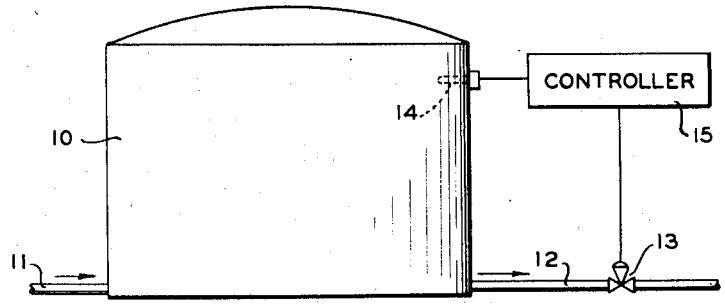
Figure 1 is a schematic representation of a liquid storage system having control apparatus of the present invention associated therewith.

Referring now to the drawing in detail and to Figure 1 in particular, there is shown a schematic application of this invention. A liquid storage tank 10 has an inlet conduit 11 connected thereto. An outlet conduit 12, having an electrically operated valve 13 therein, is provided to vent fluid from tank 10 to maintain the level in tank 10 at a preselected location which is indicated by a probe 14. Probe 14 actuates a controller 15 to open valve 13 whenever the level in tank 10 tends to rise above probe 14.

Figure 2:
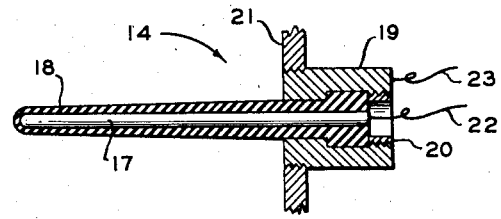
Figure 2 is a detailed view of the capacitor probe employed in the control system of Figure 1.

Probe 14 is illustrated in detail in Figure 2. The probe comprises a central metal rod 17 which is enclosed in a sleeve of insulating material 18. Sleeve 18 is positioned in a nipple 19 and retained therein by a plug 20. Nipple 19 is threaded into the wall 21 of tank 10. A first electrical lead 22 is connected to rod 17 and a second electrical lead 23 is connected to nipple 19. The probe thus forms a capacitor wherein rod 17 and tank wall 21 comprise the two spaced electrodes. The fluid in tank 10 between these elements forms the dielectric. Insulating sleeve 18 is necessary if the fluid being measured is electrically conductive. Otherwise, a sleeve need not protrude into the tank.

Figure 3:
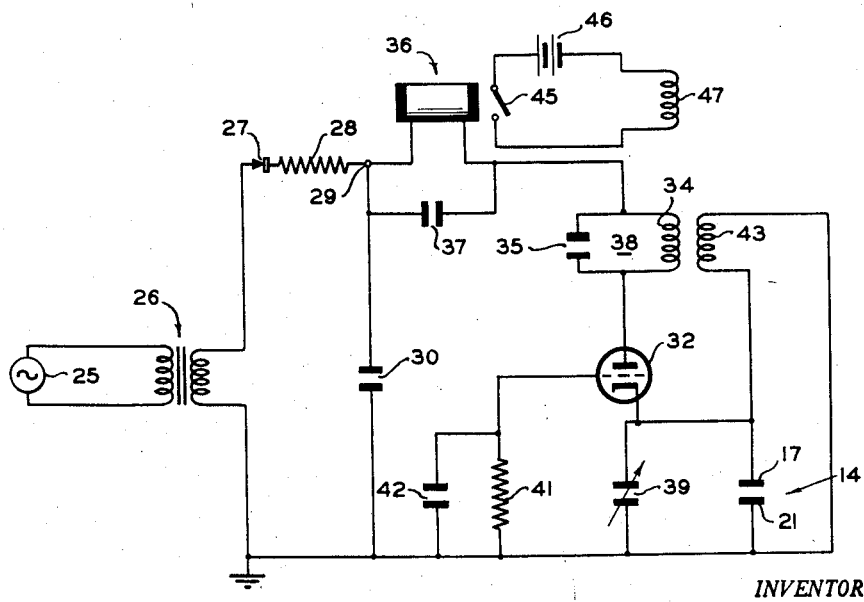
Figure 3 is a schematic circuit diagram of the electrical control system of this invention.

The electrical circuit of controller 15 is illustrated in detail in Figure 3. Probe 14 is represented as a capacitor wherein rod 17 forms one electrode and wall 21 forms the second electrode. Electrical energy is supplied to the circuit from a source of alternating current 25 which is connected across the primary winding of a transformer 26. The first terminal of the secondary winding of transformer 26 is connected to the first terminal of a rectifier 27, and the second terminal of the secondary winding is connected to ground. The second terminal of rectifier 27 is connected through a resistor 28 to a terminal 29. A capacitor 30 is connected between terminal 29 and ground. The circuit thus far described comprises a conventional power supply wherein the rectified voltage from rectifier 27 is filtered by resistor 28 and capacitor 30. Terminal 29 is thus maintained at a positive potential.

The anode of a triode 32 is connected to the first terminal of a tank circuit 38 which comprises an inductor 34 and a capacitor 35. The second terminal of tank circuit 38 is connected through the coil of a relay 36 to terminal 29. A capacitor 37 is connected in parallel with the coil of relay 36. The cathode of triode 32 is connected to ground through a variable capacitor 39. The control grid of triode 32 is connected to ground through a bias resistor 41 which is shunted by a capacitor 42. An inductor 43 is positioned adjacent inductor 34 so as to form a transformer therewith. One terminal of inductor 43 is connected to the cathode of triode 32 and to plate 17 of capacitor 14. The second terminal of inductor 43 is connected to the grounded plate 21 of capacitor 14. Relay 36 closes a switch 45 when energized. Switch 45 is connected in circuit with a voltage source 46 and a coil 47. Coil 47 energizes valve 13 to open the valve when switch 45 is closed.

The oscillator circuit is biased so that oscillations are intermittent when the dielectric constant of the material between capacitor electrodes 17 and 21 is less than a predetermined value. This occurs, for example, when the liquid level in tank 10 is below probe 14 so that air forms the major part of the dielectric between the spaced electrodes. Under this condition the grid current of triode 32 charges capacitor 42 to extinguish conduction by the triode. Oscillations are restored when the charge on capacitor 42 leaks off through resistor 41. In one particular embodiment of this circuit, which is described in detail hereinafter, the oscillator was biased so that oscillations occurred approximately 10 per cent of the time. Under this condition the average D.C. conduction through triode 32 is not sufficiently large to energize relay 36 to close switch 45. However, when a liquid such as oil is positioned between capacitor electrodes 17 and 21, the capacitance of the probe assembly is increased to decrease the energy transfer in the feedback path from inductor 43 to triode 32. This decrease in feedback energy is sufficient to allow continuous oscillation so that the average value of the D.C. conduction through triode 32 is sufficient to energize relay 36. Capacitor 37 is provided in parallel with the relay to avoid chatter. Switch 45 is closed when relay 36 is energized so that valve 13 is opened to remove fluid from tank 10.

In one particular embodiment of this invention the following circuit components were employed: Source 25 supplied energy at 115 volts, 60 cycles per second. Transformer 26 was approximately a one-to-one transformer for purposes of isolation. Resistor 28 had a value of 1000 ohms and capacitor 30 had a value of 10 microfarads. The circuit components of the oscillator were as follows: resistor 41, 500,00 ohms; capacitor 42, 0.01 microfarad; capacitor 35, 10 micro-microfarads; capacitor 37, 10 microfarads; capacitor 39, 1.5 to 7 micro-microfarads. Triode 32 was one-half of a tube 12AX7. Inductor 34 comprised 35 turns of number 32 wire. Inductor 43 comprised 18 turns of No. 28 wire. The oscillator had a frequency of approximately 7 megacycles per second. With air between capacitor electrodes 17 and 21, the oscillations were intermittent with the triode biased off approximately 90 percent of the time. With a liquid such as oil between the capacitor electrodes, the oscillations were continuous.

From the foregoing description it should be apparent that there is provided in accordance with this invention an improved liquid level indicator which employs a relatively simple electrical circuit. While the sensing capacitor has been described in conjunction with the particular probe, it should be evident that any form of condenser can be used for this purpose. The particular configuration of the condenser can be selected in accordance with the dielectric properties of the particular materials being investigated in order to provide the desired capacitance.

While the invention has been described in conjunction with a present preferred embodiment, it should be evident that it is not limited thereto.

What is claimed is:

1. Indicating apparatus comprising a first capacitor having at least two spaced elements; an oscillator comprising a vacuum tube having an anode, a cathode and a control grid, a tank circuit comprising a first inductor and a second capacitor connected in parallel relationship with one another, a bias resistor connected between said control grid and a point of reference potential, a third capacitor connected in parallel with said bias resistor, a source of direct potential, means connecting said tank circuit and said source of direct potential between said anode and said point of reference potential so that said anode is positive with respect to said point of reference potential, and feedback means including a second inductor connected in parallel with said first capacitor between said cathode and said point of reference potential so that said tube conducts intermittently when the dielectric constant of the material between said elements is less than a predetermined value, and said tube conducts substantially continuously when the dielectric constant of the material between said elements is greater than a predetermined value; and means responsive to conduction by said tube.

2. The combination in accordance with claim 1 wherein said last-mentioned means comprises a relay having the coil thereof connected in the anode-cathode circuit of said tube, and a fourth capacitor connected in parallel with the relay coil.

3. The combination in accordance with claim 1 wherein said first capacitor comprises a rod of conductive material adapted to be inserted through the wall of a container, and a sleeve of insulating material enclosing said rod, said rod and the wall of the container thereby forming said elements.

4. Indicating apparatus comprising a first capacitor having at least two spaced elements; an oscillator comprising a vacuum tube having an anode, a cathode and a control grid, a tank circuit comprising a first inductor and a second capacitor connected in parallel relationship with one another, a bias resistor connected between said control grid and a point of reference potential, a third capacitor connected in parellel with said bias resistor, a source of direct potential, means connecting said tank circuit and said source of direct potential in a series relationship between said anode and said point of reference potential so that said anode is positive with respect to said point of reference potential, a second inductor positioned in close proximity to said first inductor, one terminal of said second inductor being connected to said cathode, the second terminal of said second inductor being connected to said point of reference potential, and means connecting said first capacitor in parallel with said second inductor, the values of the circuit components of said oscillator being such that said tube conducts intermittently when the dielectric constant of the material between said elements is less than a predetermined value, and said tube conducts substantially continuously when the dielectric constant of the material between said elements is greater than a predetermined value; and means responsive to conduction of said tube.

5. The combination in accordance with claim 4 wherein said last-mentioned means comprises a relay having the coil thereof connected in the anode-cathode circuit of said tube, and a capacitor connected in parallel with the relay coil.

6. The combination in accordance with claim 4 further comprising a fourth capacitor connected in parallel with said first capacitor.

7. Indicating apparatus comprising a capacitor having at least two spaced elements, an oscillator, means for supplying operating potentials to said oscillator, means including said capacitor for intermittently operating said oscillator when the dielectric constant of the material between said elements is less than a predetermined value and for continuously operating said oscillator when the dielectric constant of the material between said elements is greater than a predetermined value, and means responsive to the output of said oscillator whereby the last said means is actuated by a change in the dielectric constant between said spaced elements.

8. Level control apparatus comprising a storage vessel having a wall; a conduit connected to said vessel; means connected to said conduit for controlling the passage of material through said conduit; a probe supported by said vessel at a pre-selected height and extending into the storage space of said vessel; means for electrically insulating said vessel from said probe at the point of support; a first electrical lead connected to said probe; a second electrical lead connected to a wall of said vessel adjacent said probe; an oscillator having an output circuit and a feedback circuit; means for inductively coupling said feedback to said out put cilrcuit; said output circuit comprising means for actuating said means for controlling; said feedback circuit including said first and second leads as means for forming a capacitor comprising said probe and said vessel wall and for connecting the capacitor into said feedback circuit, said oscillator being tuned to operate continuously upon the dielectric constant of the capacitor becoming greater than a predetermined value thereby to actuate said means for controlling.

9. The apparatus of claim 8 wherein said probe is completely covered with electrical insulating material.

10. The apparatus of claim 8 wherein said oscillator includes a vacuum tube and wherein said feedback circuit connects to the cathode of said tube.

References Cited in the file of this patent

UNITED STATES PATENTS

| | | |
|---|---|---|
| 2,094,351 | Draper | Sept. 28, 1937 |
| 2,477,511 | Comb | July 26, 1949 |
| 2,525,491 | Lawson | Oct. 10, 1950 |
| 2,564,937 | Wannamaker | Aug. 21, 1951 |
| 2,600,928 | Semm | June 17, 1952 |
| 2,720,624 | Gunst | Oct. 11, 1955 |